US011155310B2

(12) United States Patent
Rhodes et al.

(10) Patent No.: US 11,155,310 B2
(45) Date of Patent: Oct. 26, 2021

(54) ASYMMETRICAL TAILGATE (71) Applicant: Honda Motor Co., Ltd., Tokyo (JP)

(72) Inventors: Steven Daniel Rhodes, Marysville, OH (US); Christopher T. Laue, Delaware, OH (US)

(*) Notice: Subject to any disclaimer, the term of this patent is extended or adjusted under 35 U.S.C. 154(b) by 107 days.

(21) Appl. No.: 16/594,584

(22) Filed: Oct. 7, 2019

(65) Prior Publication Data
US 2021/0101645 A1 Apr. 8, 2021

(51) Int. Cl.
*B62D 33/027* (2006.01)
*B60J 5/10* (2006.01)
*E05D 15/52* (2006.01)

(52) U.S. Cl.
CPC ......... *B62D 33/0273* (2013.01); *E05D 15/52* (2013.01); *B60J 5/102* (2013.01); *B60J 5/105* (2013.01); *E05Y 2900/516* (2013.01); *E05Y 2900/544* (2013.01)

(58) Field of Classification Search
CPC ...... B62D 33/0273; B62D 33/03; B60J 5/102; B60J 5/105; B60J 5/107; B60J 5/108; E05Y 2900/516; E05Y 2900/544; E05D 15/52
USPC .......................................... 296/50, 51, 57.1
See application file for complete search history.

(56) References Cited

U.S. PATENT DOCUMENTS

| 6,938,941 | B2 | 9/2005 | Thiele et al. |
| 7,118,153 | B2 | 10/2006 | Kitayama et al. |
| 7,150,486 | B2 | 12/2006 | Ichinose |
| 7,258,373 | B2 | 8/2007 | Plett et al. |
| 8,167,341 | B2 | 5/2012 | Gruber et al. |
| 8,443,638 | B2 | 5/2013 | Zagoroff |
| 8,740,279 | B1* | 6/2014 | McGoff ............... E05B 83/20 296/51 |
| 9,975,501 | B1 | 5/2018 | Frederick et al. |
| 10,093,362 | B2 | 10/2018 | Estrada |
| 2003/0122396 | A1* | 7/2003 | Humphrey ......... B62D 33/0273 296/51 |
| 2004/0174035 | A1* | 9/2004 | Acker ................ B62D 33/0273 296/57.1 |
| 2006/0001288 | A1* | 1/2006 | Thiele ................... E05D 15/505 296/50 |
| 2007/0090662 | A1* | 4/2007 | Katterloher .......... B62D 33/023 296/57.1 |
| 2008/0190977 | A1 | 8/2008 | Estabrook |
| 2008/0252092 | A1* | 10/2008 | Waldner ................. E05D 15/52 296/51 |
| 2009/0183433 | A1* | 7/2009 | Cheung .............. B62D 33/0273 49/169 |
| 2009/0250959 | A1* | 10/2009 | Townson ................. E05D 3/10 296/51 |

(Continued)

FOREIGN PATENT DOCUMENTS

CA 2584096 10/2007

*Primary Examiner* — Gregory A Blankenship
(74) *Attorney, Agent, or Firm* — Rankin, Hill & Clark LLP (57) ABSTRACT

A tailgate assembly mounted along an open edge of a vehicle's load carrying bed includes a frame having a first or proximal lateral side adapted to be hingedly connected for opening in a swing open mode and a second or distal lateral side oppositely positioned relative to the first lateral side. The tailgate assembly further includes a reinforcement frame component overlaid onto the frame at the first lateral side to increase torsional stiffness at or near the first lateral side.

16 Claims, 6 Drawing Sheets

(56) References Cited

U.S. PATENT DOCUMENTS

| | | | |
|---|---|---|---|
| 2009/0250960 A1* | 10/2009 | Townson | B62D 33/0273 |
| | | | 296/51 |
| 2009/0250961 A1 | 10/2009 | Townson | |
| 2012/0324793 A1* | 12/2012 | Abbasi | B62D 33/0273 |
| | | | 49/168 |
| 2014/0265414 A1* | 9/2014 | Patterson | B60J 5/107 |
| | | | 296/50 |
| 2017/0369108 A1* | 12/2017 | Smith | B62D 43/02 |
| 2018/0162284 A1* | 6/2018 | Lewis | B60J 5/105 |
| 2019/0185074 A1* | 6/2019 | Morley | E05D 15/522 |
| 2019/0301223 A1* | 10/2019 | Ihrke | E05F 7/04 |
| 2020/0247843 A1* | 8/2020 | Ahn | C07K 1/18 |
| 2021/0101645 A1* | 4/2021 | Rhodes | B60J 5/045 |

\* cited by examiner

FIG. 9    FIG. 10

ASYMMETRICAL TAILGATE

BACKGROUND

Dual-mode tailgates are generally known. "Dual-mode" refers to the two directions or pivot axes along which a dual-mode tailgate is openable. For example, a dual-mode tailgate can be selectively openable in a first, fold-down direction about an axis generally parallel with a bottom edge of the tailgate similar to a conventional tailgate. The dual-mode tailgate can also be selectively openable in a second, side-to-side direction about an axis generally parallel with a lateral edge of the tailgate. This type of dual-mode tailgate cannot have a pair of full-time support cables extending from opposite lateral sides of the tailgate because the dual-mode tailgate needs to be able to swing open.

Known dual-mode tailgates typically include frames that are generally symmetrical about a vertical plane disposed between first and second lateral sides of the tailgate and orthogonally oriented relative to a longitudinal extent of the tailgate extending between the first and second lateral sides. A drawback of such a structure is that mechanical stresses on the tailgate in both opening modes are asymmetrical. For example, bending stresses can be very high on the hinged side of the tailgate when opened in the side-to-side direction but possibly very low on the non-hinged side in the same mode. When opened in the fold-down direction, one side of the tailgate is typically supported with a cable while the other side is not thereby resulting in bending stresses that again are unequal side-to-side along a longitudinal extent of the tailgate. Reinforcement components are typically added to both lateral sides of the symmetrical frame to handle the loads and minimize deflections. However, this results in a tailgate that can be heavy and somewhat inefficient in its overall structural design.

BRIEF DESCRIPTION

According to one aspect, a tailgate assembly mounted along an open edge of a vehicle's load carrying bed includes a frame having a first or proximal lateral side adapted to be hingedly connected for opening in a swing open mode and a second or distal lateral side oppositely positioned relative to the first lateral side. The tailgate assembly further includes a reinforcement frame component overlaid onto the frame at the first lateral side to increase torsional stiffness at or near the first lateral side.

According to another aspect, a dual-mode tailgate for an associated vehicle includes a frame hingedly connected to the associated vehicle for pivoting movement about a first pivot axis arranged generally horizontally and having a lateral side hingedly connected to an associated vehicle for pivoting movement about a second pivot axis arranged generally vertically. The dual-mode tailgate further includes a reinforcement frame component secured to the frame at or adjacent the lateral side hingedly connected to the associated vehicle.

According to a further aspect, a dual-mode tailgate mounted along an open edge of a load carrying bed on a vehicle includes a frame and a reinforcement frame component. The frame has a proximal lateral side hingedly connected to a sidewall of the load-carrying bed for opening of the tailgate in a swing open mode about a vertical axis and a lower side hingedly connected to a rear edge of the load carrying bed for opening of the tailgate in a flip open mode about a horizontal axis. The reinforcement frame component is disposed at the proximal lateral side of the frame for countering torsional loads on the frame when the tailgate is opened in the swing open mode. The frame is asymmetrically arranged from the proximal lateral side to a distal lateral side positioned opposite the proximal lateral side.

DETAILED DESCRIPTION

Figure 1:
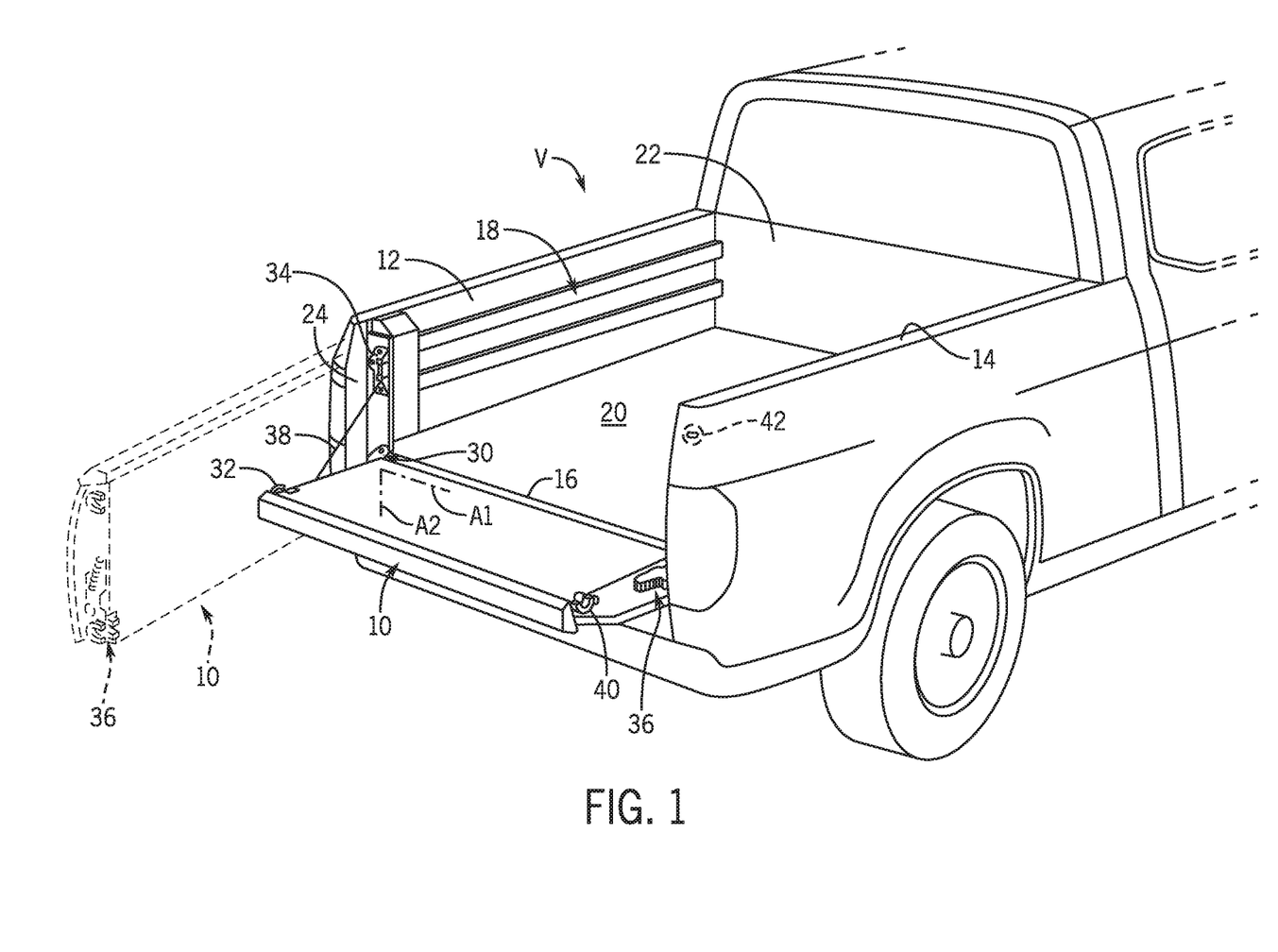
FIG. 1 is a partial perspective view of a vehicle having a dual-mode tailgate mounted along an open edge of the vehicle's load carrying bed.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 illustrates a dual-mode or dual-axis tailgate 10, also referred to herein as a tailgate assembly, operatively disposed on vehicle V. The tailgate 10 is pivotally coupled to opposing sidewalls 12, 14 of the vehicle V. In particular, as shown, the tailgate 10 is mounted along an open edge 16 of a load carrying bed 18 of the vehicle V. The bed 18 includes a bed floor 20, sidewalls 12, 14, and cab wall 22 extending upwardly adjacent three edges and forming a portion of the vehicle body of the vehicle V.

The dual-mode tailgate 10 for the associated vehicle V is positioned along the open, rear edge 16 of the bed floor 20, and extends between the first and second sidewalls 12, 14 to selectively close an open end of the load carrying bed 18. The tailgate 10 is mounted to the vehicle V and is able to pivot about a first axis A1 for movement between a closed position and a fold-open position (the position shown in solid lines in FIG. 1). The first axis A1, also referred to herein as a horizontal axis, is generally horizontal and parallel with the rear or open edge 16 of the bed floor 20. Opening of the tailgate 10 about the first axis A1 can be referred to as opening the tailgate in a flip open mode.

The tailgate 10 is also alternatively able to pivot about a second axis A2 for movement between the closed position and a swing-open position (the position shown in dashed lines in FIG. 1). The second axis A2 is generally vertical and parallel with a first sidewall end 24, which also defines the opening in which the tailgate 10 is disposed. The second axis A2, also referred to herein as a vertical axis is generally perpendicular or normal relative to the first axis A1. Opening of the tailgate 10 about the second axis A2 can be referred to as opening the tailgate in a swing opened mode.

To facilitate the dual-mode action of the tailgate 10, a dual-mode hinge assembly 30 attaches or is mounted to the tailgate 10 at or adjacent a first corner of the tailgate (lower left corner in FIG. 1). The dual-mode hinge assembly 30 pivotally connects the tailgate 10 along the first and second axes A1 and A2 to the vehicle V. A first hinged/lock assembly 32 attaches or is mounted to the tailgate 10 at or adjacent a second corner of the tailgate (upper left corner in FIG. 1) and is spaced from the hinge assembly 30 in a first direction. The first hinge/lock assembly 32 selectively latches or locks to a first hinge/lock striker 34 to releasably lock the tailgate 10 to the vehicle V. When operating as a hinge, the first hinge/lock assembly 32 cooperates with the hinge assembly 30 to pivotally support the tailgate 10 along or about the second axis A2 and allows the tailgate 10 to move between the tailgate closed position and the swing-open position.

A second hinge/lock assembly 36 attaches or is mounted to the tailgate 10 at or adjacent a third corner of the tailgate (lower right corner in FIG. 1) and is spaced apart from the hinge assembly 30 in a second direction. The second hinge/lock assembly 36 selectively latches or locks to a second hinge/lock striker (not visible in FIG. 1) to releasably lock the tailgate 10 to the vehicle V when the tailgate is in the closed position. The second hinge/lock assembly 36 cooperates with the hinge assembly 30 to pivotally support the tailgate 10 along or about the first axis A1 and allows the tailgate 10 to move between the tailgate closed position and the fold-open or a flip-down position. A support cable 38 is optionally provided for supporting the tailgate 10 in the flip-down position.

A locking assembly 40 attaches or is mounted to the tailgate 10 at or adjacent a fourth corner of the tailgate (upper right corner in FIG. 1). The locking assembly 40 selectively latches to a locking striker 42 to releasably lock the tailgate 10 to the vehicle V. The tailgate 10 is openable toward or to the fold-open position about the first axis A1 when both the first hinge/lock assembly 32 is unlatched from the first hinge/lock striker 34 and the locking assembly 40 is unlatched from the locking striker 42. The tailgate 10 is openable toward or to the swing-open position about the second axis A2 when both the second hinge/lock assembly 36 is unlatched from the second hinge/lock striker (again, not visible in FIG. 1) and the locking assembly 40 is unlatched from the locking striker 42.

Figure 2:
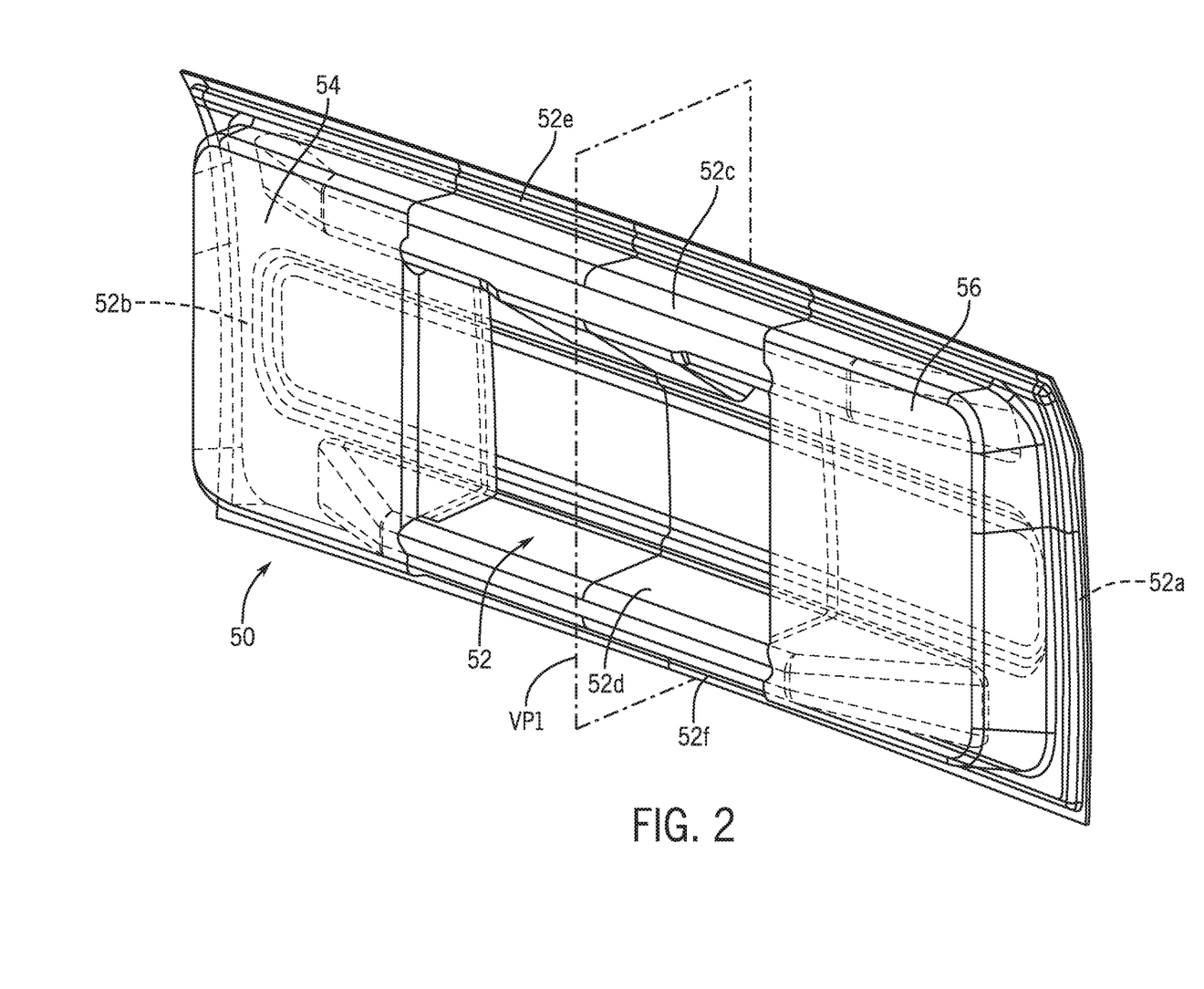
FIG. 2 is a perspective view of a known tailgate frame assembly including a symmetrical frame having a pair of spaced apart reinforcement frame components overlaid at lateral ends thereof.

With reference now to FIG. 2, a known tailgate assembly 50 is illustrated that could be used as the tailgate 10 shown in FIG. 1. The known tailgate assembly 50 of FIG. 2 includes a symmetrical frame 52 having a first or proximal lateral side 52a and a second or distal lateral side 52b oppositely positioned relative to the first lateral side 52a. The first lateral side 52a is a mirror image 52b, or at least a substantial mirror image, of the second lateral side 52b about a vertical plane VP1 disposed between, and particularly equidistant apart from each of, the first and second lateral sides 52a, 52b. The vertical plane VP1 is also generally orthogonally oriented relative to a longitudinal extent of the symmetrical frame 52 extending between the first and second lateral ends 52a, 52b.

The known tailgate assembly 50 further includes a pair of spaced apart reinforcement frame components 54, 56. Each frame component 54, 56 is overlaid onto the frame 52 at, respectively, the first and second lateral sides 52a, 52b to meet load and deflection requirements for the tailgate assembly 50. As shown, the symmetrical frame 52 includes vertically spaced apart beam or embossment sections 52c, 52d extending along nearly an entire longitudinal extent of the frame 52. The beam sections 52c, 52d are disposed adjacent, respectively, upper and lower edges 52e, 52f of the frame 52. Each frame component 54, 56 form a box shaped configuration together with the frame 52, and particularly with the beam sections 52c, 52d at each of the lateral sides 52a, 52b of the frame 52. One drawback with the known tailgate assembly 50 is that mechanical stresses on the tailgate 50 when opening in each of the dual modes are asymmetrical. For example, this necessitates the use of both frame components 54, 56 at each of the lateral sides 52a, 52b of the frame 52, which greatly increases the weight of the tailgate. In particular, the use of both frame components 54, 56 is necessary due to the symmetry of the frame 52 in order to provide the frame 52 the required torsional stiffness needed to support the bending forces (i.e., moment forces) applied at the distal lateral side 52b when the tailgate 50 is in the swing-open positon.

Figure 3:
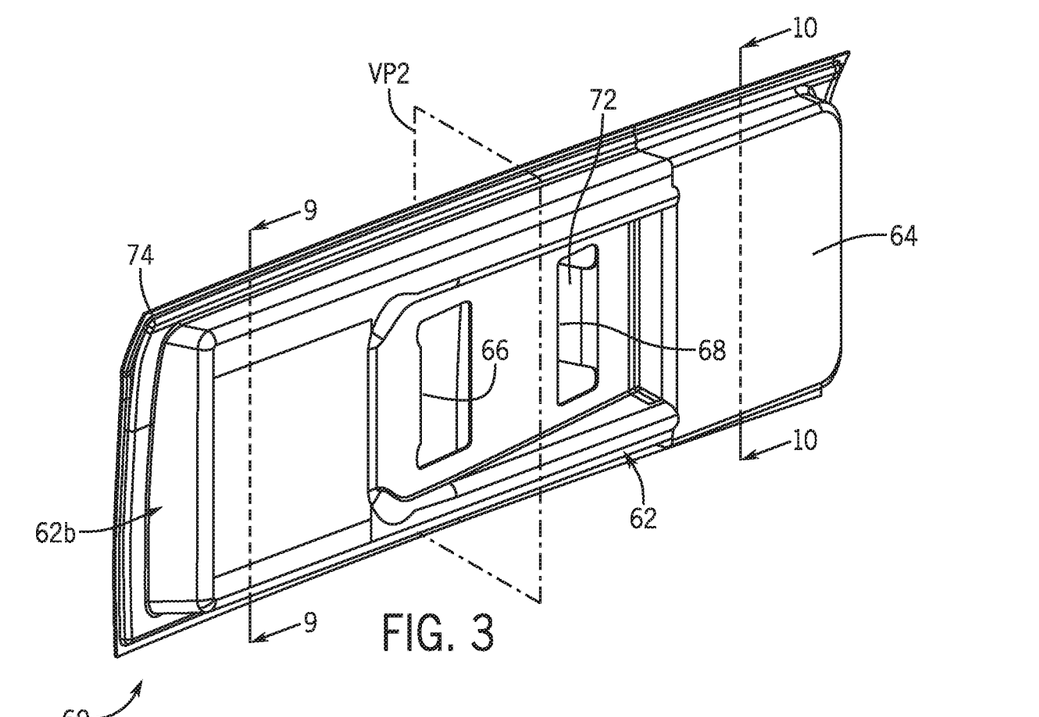
FIG. 3 is a perspective view of a tailgate assembly having an asymmetrical frame and a reinforcement frame component overlaid onto the frame at first lateral side thereof according to an exemplary embodiment.

Now with reference to FIG. 3, a tailgate assembly 60 is shown according to an exemplary embodiment, which can be used as the tailgate assembly 10 of FIG. 1 or as a component of the tailgate assembly 10 of FIG. 1. The tailgate assembly 60 is thus adapted to be mounted along the open edge 16 of the vehicle's load carrying bed 18 in FIG. 1 for movement in each the dual-modes (i.e., flip down and swing open). The tailgate assembly 60 of the illustrated embodiment includes a frame 62 having a first or proximal lateral side 62a adapted to be hingedly connected for opening in a swing open mode and a second or distal lateral side 62b oppositely positioned relative to the first lateral side 62a. Accordingly, the tailgate assembly 60, including the frame 62, can be hingedly connected to the associated vehicle V for a pivoting movement about the first pivot axis A1 arranged generally horizontally and the frame 62 can have a lateral side (i.e., the first or proximal lateral side 62a) hingedly connected to the associated vehicle V for pivoting movement about the second pivot axis A2 arranged generally vertically.

The tailgate assembly 60 further includes a reinforcement frame component 64 and a skin or skin component 74. The reinforcement frame component 64 is overlaid onto the frame 62 at or adjacent the first lateral side 62a (FIGS. 4 and 5) to increase torsional stiffness of the tailgate assembly 60 at or near the first lateral side 62a. This can be advantageous for addressing the load requirements required at the first lateral side 62a when the tailgate assembly 60 is opened to the swing open position (shown in phantom in FIG. 1).

Figure 4:
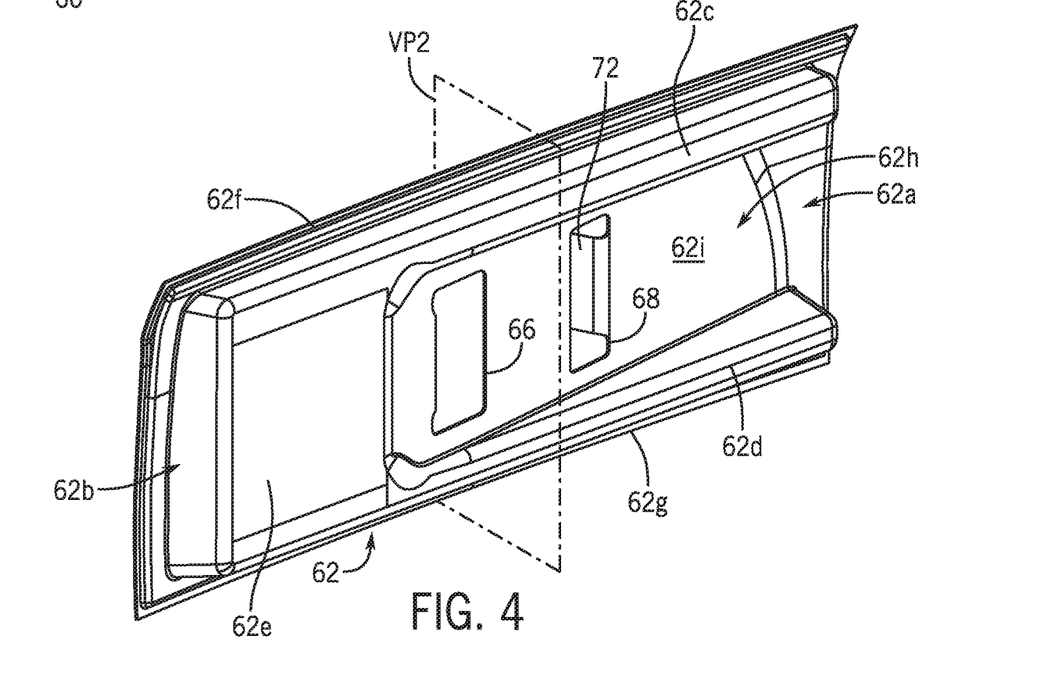
FIG. 4 is an isolated perspective view of the frame of FIG. 3.
Figure 5:
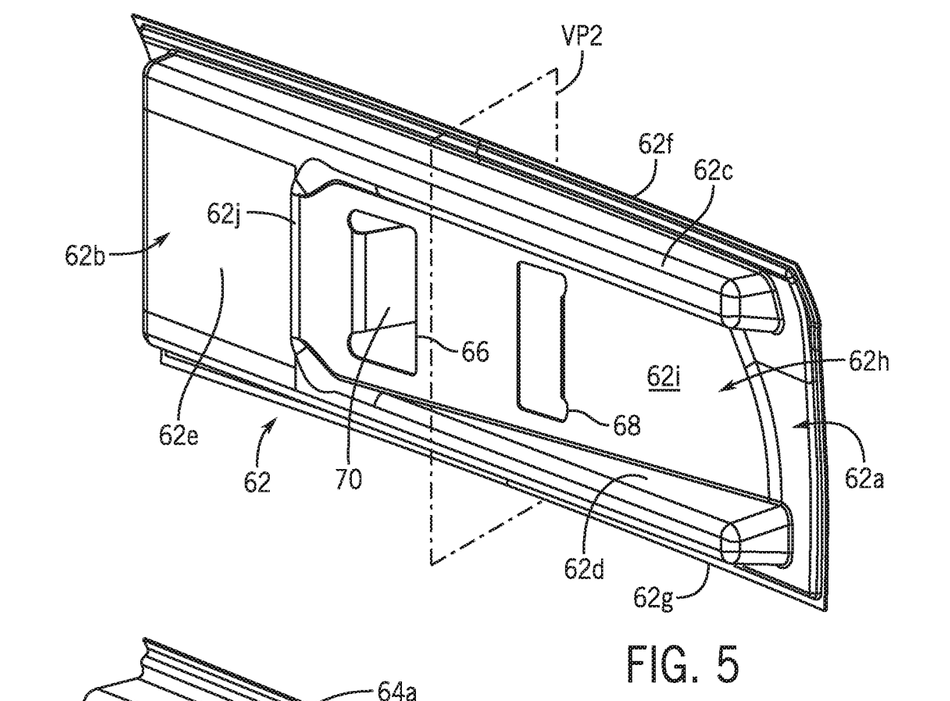
FIG. 5 is another isolated perspective view of the frame of FIG. 3.
Figure 9:
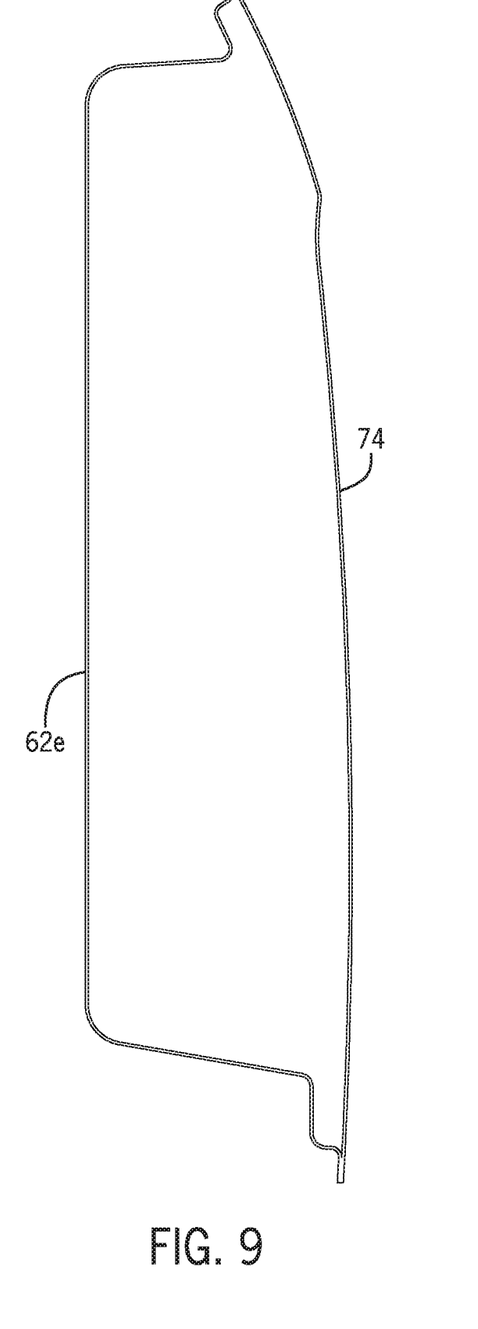
FIG. 9 is a cross-sectional view of the tailgate assembly taken along the line 9-9 of FIG. 3.
Figure 10:
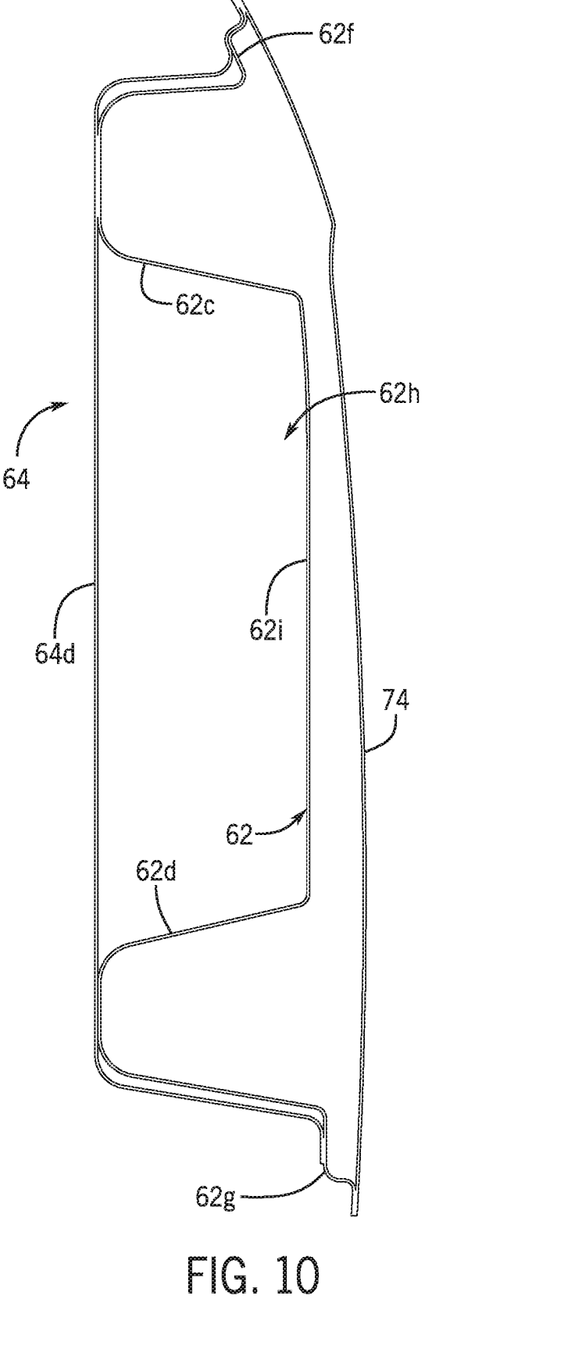
FIG. 10 is a cross-sectional view of the tailgate assembly taken along the line 10-10 of FIG. 3.

With additional reference to FIGS. 4 and 5, the frame 62 is asymmetrical about a vertical plane VP2 disposed between the first and second lateral side 62a, 62b and thus can be referred to as an asymmetrical frame. The vertical plane VP2 is generally orthogonally oriented relative to a longitudinal extent of the frame 62 extending between the first and second lateral sides 62a, 62b and is spaced apart, such as equidistant, form each of the lateral sides 62a, 62b As shown, the frame 62 can have a dual beam configuration at the first lateral side 62a (see also FIG. 10) and can have a box shaped configuration at the second lateral side 62b (see also FIG. 9). More particularly, the first lateral side 62a can include vertically spaced apart beam or embossment sections 62c, 62d and the second lateral side 62b can include a boxed section 62e. The beam sections 62c, 62d can be arranged adjacent respective upper and lower sides or edges 62f, 62g of the frame 62 to define a recessed valley section 62h therebetween (i.e., the lower edge 62g is oppositely positioned relative to the upper edge 62f). As shown in the illustrated embodiment, a vertical extent of the recessed valley section 62h can be greater than 50% of an entire vertical height of the frame 62, particularly when the frame 62 is in the closed mode (i.e., not in open flip down state). The beam sections 62c, 62d can provide sufficient bending strength (i.e., resistance to bending or torsional stiffness) at the proximal lateral side 62a particularly for when the tailgate 60 is operated in the swing-open mode and the tailgate 60 is opened to the swing-open position wherein a very high bending moment force is applied to the tailgate at the proximal lateral side 62a.

As also shown, a middle wall 62i forms a base of the recess valley section 62h and gradually slopes from the boxed section 62e toward the first lateral side 62a. More particularly, the middle wall 62i tapers from a raised elevation at an edge 62j of the boxed section 62e toward a lowered elevation at the lateral side 62a. The middle wall 62i of the frame 62 can define apertures 66, 68 within the frame. These apertures 66, 68 can include support flaps 70, 72. The tailgate assembly 60 can further include a skin 74 attached to an outward facing side of the frame 62 to face away from the vehicles load carrying bed 18 when the tailgate assembly 60 is in the closed mode. The support flaps 70, 72 of the frame 60 can have distal ends (not shown) that rest against or abut the skin 74 so as to provide support thereto. As such, the support flaps 70, 72 extend away from the middle wall 62i toward the skin 74 for support thereof.

Figure 6:
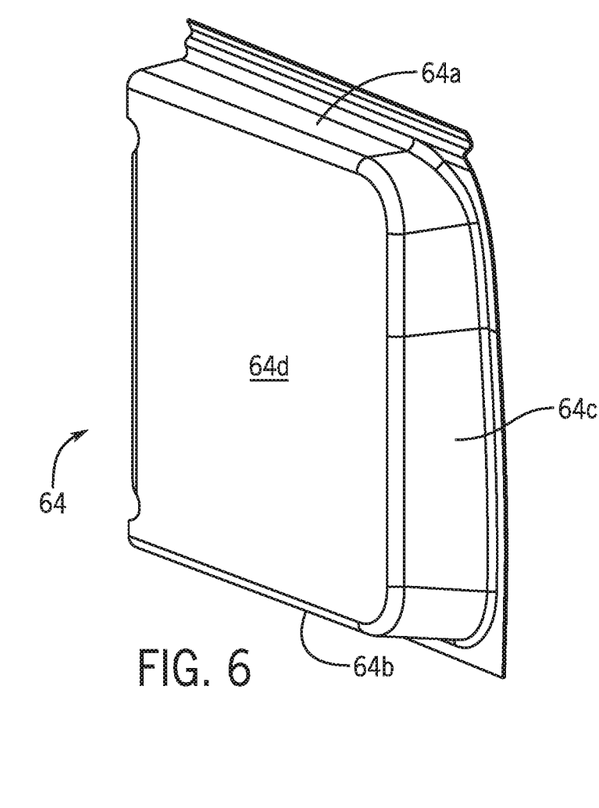
FIG. 6 is an isolated perspective view of the reinforcement frame component of FIG. 3.
Figures 7, 8:
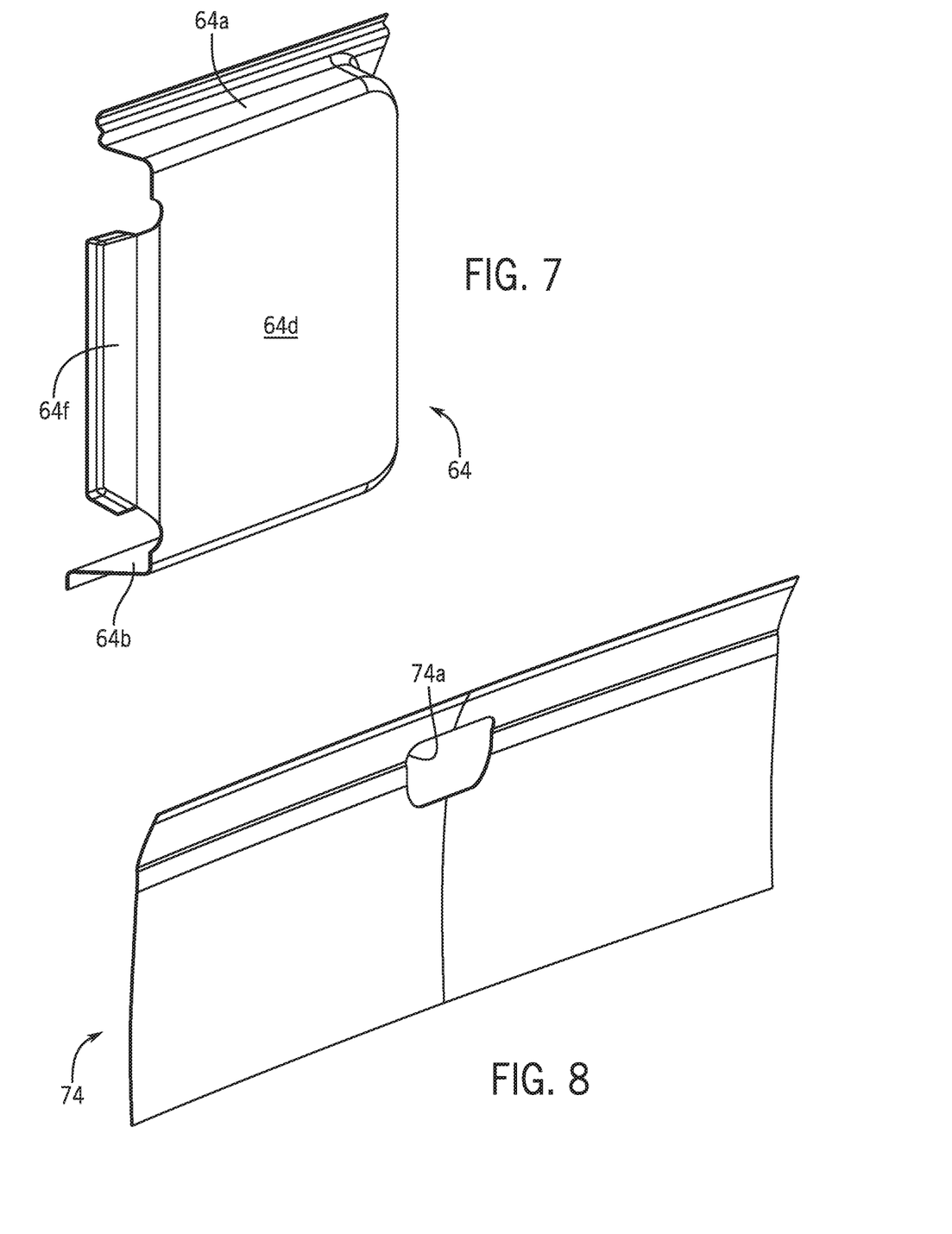
FIG. 7 is another isolated perspective view of the frame component of FIG. 6.
FIG. 8 is a perspective view of a skin of the tailgate assembly of FIG. 3.

With additional reference to FIGS. 6 and 7, the reinforcement frame section 64 can include upper and lower wall sections 64a, 64b and a lateral wall section 64c. These wall sections 64a, 64b, 64c can support an elevated wall section 64e. A support tab 64f can depend from the elevated wall section 64e opposite the wall section 64c. More particularly, the wall sections 64a, 64b can complementarily wrap around outer sides of the beam sections 62c, 62d of the frame 62 as shown in FIG. 3. The lateral wall section 64c can extend between the spaced apart beam sections 62c, 62d with the elevated wall section supported in an elevated state by the spaced apart beam sections 62c, 62d such that the reinforcement frame component 64 together with the frame 62 forms another box section or boxed section configuration at the first lateral side 62a of the frame. Accordingly, the reinforcement frame component 64 and the frame 62 at the proximal lateral side 62a having the dual beam configuration together form another boxed shape configuration.

By this arrangement, boxed frame sections or configurations are thereby provided at each end of the tailgate assembly 60 and these are adapted to be hingedly connected to the vehicles load carrying bed 18. The elevated wall section 64e can be orthogonally oriented relative to the wall section 64a, 64b, 64c of the reinforcement frame component 64. The wall section 64e can be spaced apart from the middle wall 62i of the frame 62 when the reinforcement frame component 64 is overlaid onto the frame 62 in the tailgate assembly 60.

Advantageously, the asymmetrical frame 62 and thus the asymmetrical tailgate assembly 60 are able to efficiently accommodate the asymmetrical stresses caused by dual mode loading scenarios. In particular, the frame 62 is formed so as to change gradually from a dual beam type structure at the first lateral side 62a, which is the side that is hingedly connected to the vehicle V when the tailgate assembly 60 is in the swing-open mode so as to pivot open about the second axis A2. Also, the frame 62 forms into the boxed shape at the second lateral side 62b to reduce weight and still provide appropriate torsional stiffness for the flip open mode, i.e., when the tailgate is opened about the pivot axis A1.

The reinforcement frame component 64 is secured directly to both the frame 60 and skin 74 to form a boxed section at or adjacent the first lateral side 62a. In one embodiment, the reinforcement frame component 64 can be formed of a stamped sheet metal and can be welded to the frame 60 for rigid securement thereto. It should be appreciated, however, that one or both the reinforcement frame component 64 and the frame 62 can be formed of other materials (e.g., non-metal materials, such as a composite material, plastic, etc.), including dissimilar materials, and can be secured to one another via other means of attachment (e.g., via suitable fasteners, adhesives, etc.).

With additional reference to FIG. 8, the skin 74 can be secured to the outward facing side of the frame 60. Such securement can include suitable fasteners and/or adhesive. In one embodiment, the skin 74 is formed of sheet metal, though this is not required and the skin 74 can be formed of other materials (e.g., non-metal materials, such as a composite material, plastic, etc.). The reinforcement frame component 64 can also be secured to the skin 74 directly via a suitable adhesive or adhesive component, though this is not required. The skin 74 can define an aperture 74a for access to a handle assembly (not shown) for operating the tailgate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tailgate assembly mounted along an open edge of a vehicle's load carrying bed, the tailgate assembly comprising:
   a frame having a first or proximal lateral side adapted to be hingedly connected for opening in a swing open mode and a second or distal lateral side oppositely positioned relative to the first lateral side; and
   a reinforcement frame component overlaid onto the frame at the first lateral side to increase torsional stiffness at or near the first lateral side,
   wherein the frame is asymmetrical about a vertical plane disposed between the first and second lateral sides, said vertical plane generally orthogonally oriented relative to a longitudinal extent of the frame extending between the first and second lateral sides,
   wherein the first lateral side includes vertically spaced apart beam or embossment sections, the second lateral side includes a boxed section, and the beam sections are each arranged adjacent respective lower and upper edges of the frame to define a recessed valley section therebetween,
   wherein a middle wall forming the recessed valley section gradually slopes from the boxed section toward the first lateral side.

2. The tailgate assembly of claim 1 wherein a vertical extent of the recessed valley section is greater than 50% of an entire vertical height of the frame when in the closed mode.

3. The tailgate assembly of claim 1 further including a skin attached to an outward facing side of the frame to face away from the vehicle's load carrying bed when the tailgate assembly is in a closed mode.

4. The tailgate assembly of claim 3 wherein the reinforcement frame component is secured directly to both the frame and the skin to form a boxed section at or adjacent the first lateral side.

5. The tailgate assembly of claim 1 wherein the frame has a lower side adapted to be hingedly connected for opening in a flip open mode and an upper side oppositely positioned relative to the lower side.

6. The tailgate assembly of claim 5 wherein the second lateral side of the frame is formed as a boxed section and the reinforcement frame component together with the frame forms another boxed section at the first lateral side of the frame, the boxed frame sections adapted to be hingedly connected to the vehicle's load-carrying bed.

7. The tailgate assembly of claim 1 wherein the reinforcement frame component is welded to the frame for rigid securement thereto.

8. The tailgate assembly of claim 7 wherein the reinforcement frame component is secured to the skin via a suitable adhesive or adhesive component.

9. The tailgate assembly of claim 1 further including a cable provided only at the first lateral side for connecting the frame to the load carrying bed and supporting the frame when in a flip down mode.

10. A dual-mode tailgate for an associated vehicle, comprising:
a frame hingedly connected to the associated vehicle for pivoting movement about a first pivot axis arranged generally horizontally and having a lateral side hingedly connected to the associated vehicle for pivoting movement about a second pivot axis arranged generally vertically; and
a reinforcement frame component secured to the frame at or adjacent said lateral side,
wherein the frame has a dual beam configuration at the lateral side and wherein the lateral side is a proximal lateral side, the frame also having a distal lateral side opposite the proximal lateral side that has a box shaped configuration,
wherein the reinforcement frame component and the frame at the proximal lateral side having the dual beam configuration together form another boxed shaped configuration.

11. The dual-mode tailgate of claim 10 wherein the frame is asymmetrical about a vertical plane.

12. The dual-mode tailgate of claim 11 wherein the vertical plane is orthogonally oriented relative to a longitudinal extent of the frame and spaced apart from the lateral side.

13. The dual-mode tailgate of claim 10 wherein the frame has a wall tapering from a raised elevation at an edge of the boxed shaped configuration toward a lowered elevation at the proximal lateral side.

14. A dual-mode tailgate mounted along an open edge of a load carrying bed on a vehicle, comprising:
a frame having a proximal lateral side hingedly connected to a side wall of the load-carrying bed for opening of the tailgate in a swing open mode about a vertical axis and a lower side hingedly connected to a rear edge of the load carrying bed for opening of the tailgate in a flip open mode about a horizontal axis;
a reinforcement frame component disposed at the proximal lateral side of the frame for countering torsional loads on the frame when the tailgate is opened in the swing open mode; and
a skin attached to an outward facing side of the frame to face away from the vehicle's load carrying bed when the tailgate is in a closed mode;
wherein the frame is asymmetrically arranged from the proximal lateral side to a distal lateral side positioned opposite the proximal lateral side, and
wherein the reinforcement frame component is secured directly to both the frame and the skin to form a boxed section with the frame at or adjacent the proximal lateral side.

15. The dual-mode tailgate of claim 14, further comprising:
support flaps extended away from a middle wall of the frame, toward the skin, wherein the support flaps have distal ends that abut the skin.

16. The dual-mode tailgate of claim 15, wherein the middle wall of the frame defines apertures which include the support flaps such that the support flaps extend away from the middle wall of the frame at the apertures.

* * * * *